United States Patent
Arai

(10) Patent No.: US 10,264,226 B2
(45) Date of Patent: Apr. 16, 2019

(54) ILLUMINATION DEVICE AND ELECTRONIC DEVICE

(71) Applicant: SHARP KABUSHIKI KAISHA, Sakai, Osaka (JP)

(72) Inventor: Takeshi Arai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/065,913

(22) PCT Filed: Jan. 11, 2017

(86) PCT No.: PCT/JP2017/000528
§ 371 (c)(1),
(2) Date: Jun. 25, 2018

(87) PCT Pub. No.: WO2017/126369
PCT Pub. Date: Jul. 27, 2017

(65) Prior Publication Data
US 2019/0020859 A1 Jan. 17, 2019

(30) Foreign Application Priority Data
Jan. 22, 2016 (JP) .................. 2016-011111

(51) Int. Cl.
*G06F 3/038* (2013.01)
*G09G 5/10* (2006.01)
(Continued)

(52) U.S. Cl.
CPC ......... *H04N 9/3138* (2013.01); *G02B 6/0025* (2013.01); *G09F 13/00* (2013.01); *G09F 13/20* (2013.01); *G09F 2013/222* (2013.01)

(58) Field of Classification Search
CPC .......... G06F 3/016; G06F 3/011; G06F 3/038; G06F 3/03543; G06F 3/0338;
(Continued)

(56) References Cited

U.S. PATENT DOCUMENTS

| | | | | |
|---|---|---|---|---|
| 2004/0227456 | A1* | 11/2004 | Matsui | H04N 9/3102 313/501 |
| 2006/0077384 | A1 | 4/2006 | Yokota et al. | |
| 2014/0362600 | A1* | 12/2014 | Suckling | F21S 41/663 362/583 |

FOREIGN PATENT DOCUMENTS

| | | |
|---|---|---|
| JP | 52-75776 B2 | 6/1977 |
| JP | 53-119773 B2 | 9/1978 |

(Continued)

OTHER PUBLICATIONS

Written Opinion for PCT/JP2017/000528, Mar. 14, 2017.

*Primary Examiner* — Minh D A
(74) *Attorney, Agent, or Firm* — ScienBiziP, P.C.

(57) ABSTRACT

Light is made more expressive by a simple configuration of an illumination device. An illumination device (10) includes: a projection section on which beams of light which beams are emitted from a first LED (1A) and a second LED (1B), respectively, are to be projected; and a light emission control section (3) configured to control the first LED (1A) and the second LED (1B) so as to temporally change intensities of the beams of light. The first LED (1A) and the second LED (1B) are provided so that the beams of light which beams are emitted from the first LED (1A) and the second LED (1B), respectively, overlap in part in the projection section, and assuming that a part of the projection section in which part the beams of light overlap is an overlapping part, the light emission control section (3)

(Continued)

changes the intensities of the beams of light so that at least any one of a size, a location, and a shape of the overlapping part is temporally changed.

13 Claims, 7 Drawing Sheets

(51) Int. Cl.
    *H04N 9/31*     (2006.01)
    *G09F 13/00*     (2006.01)
    *G09F 13/20*     (2006.01)
    *F21V 8/00*     (2006.01)
    *G09F 13/22*     (2006.01)

(58) Field of Classification Search
    CPC ............... G09G 3/3688; G09G 3/3648; G09G 2330/021; G09G 2310/027; G09G 5/006; G09G 2300/0842; G09G 3/3233; G09G 2300/0426; G09G 2300/0809; G09G 2300/0408; G09G 2320/0276; G09G 2360/16; G09G 2320/0626; G09G 3/3611; G09G 3/2014; G09G 3/2022; G09G 3/2029; G09G 2320/0247; G09G 2320/0266; G02F 1/13452; G02F 1/13454; H05K 3/361
    See application file for complete search history.

(56) References Cited

FOREIGN PATENT DOCUMENTS

| JP | 2007-163760 A | 6/2007 |
|----|---------------|--------|
| JP | 2009-75612 A  | 4/2009 |

* cited by examiner

ILLUMINATION DEVICE AND ELECTRONIC DEVICE

TECHNICAL FIELD

The present invention relates to an illumination device that is provided in, for example, an electronic device.

BACKGROUND ART

Various electronic devices (e.g., a mobile terminal) each including an illumination device have been widely used in recent years. In such electronic devices, light that is emitted from an illumination device is used to, for example, send a notice (e.g., a notice of the receipt of an e-mail) to a user. Patent Literature 1 discloses an illumination device (illumination structure) that is directed to allow an electronic device to achieve a higher illumination effect of light emission. Specifically, the illumination device of Patent Literature 1 includes an illumination lens configured to emit light from a light source by refracting the light in a plurality of different directions.

CITATION LIST

Patent Literature

[Patent Literature 1]
Japanese Patent Application Publication Tokukai No. 2009-75612 (Publication date: Apr. 9, 2009)

SUMMARY OF INVENTION

Technical Problem

Note, however, that according to the illumination device of Patent Literature 1, a relative position of the light source with respect to the illumination lens is moved so that light is made still more expressive. This necessitates, for example, means for mechanically changing the position of the light source, so that unfortunately, the illumination device is made complicated in configuration. An aspect of the present invention has been made in view of the problem, and an object of an aspect of the present invention is to achieve an illumination device that allows light to be more expressive by a simple configuration.

Solution to Problem

In order to attain the object, an illumination device in accordance with an aspect of the present invention includes: a projection section on which beams of light which beams are emitted from respective two or more light sources are to be projected; and a light emission control section configured to control the two or more light sources so as to temporally change intensities of the beams of light, the two or more light sources being provided so that the beams of light which beams are emitted from the respective two or more light sources overlap in part in the projection section, and assuming that a part of the projection section in which part the beams of light overlap is an overlapping part, the light emission control section changing the intensities of the beams of light so that at least any one of a size, a location, and a shape of the overlapping part is temporally changed.

Advantageous Effects of Invention

An illumination device in accordance with an aspect of the present invention yields an effect of allowing light to be more expressive by a simple configuration.

Figure 2:
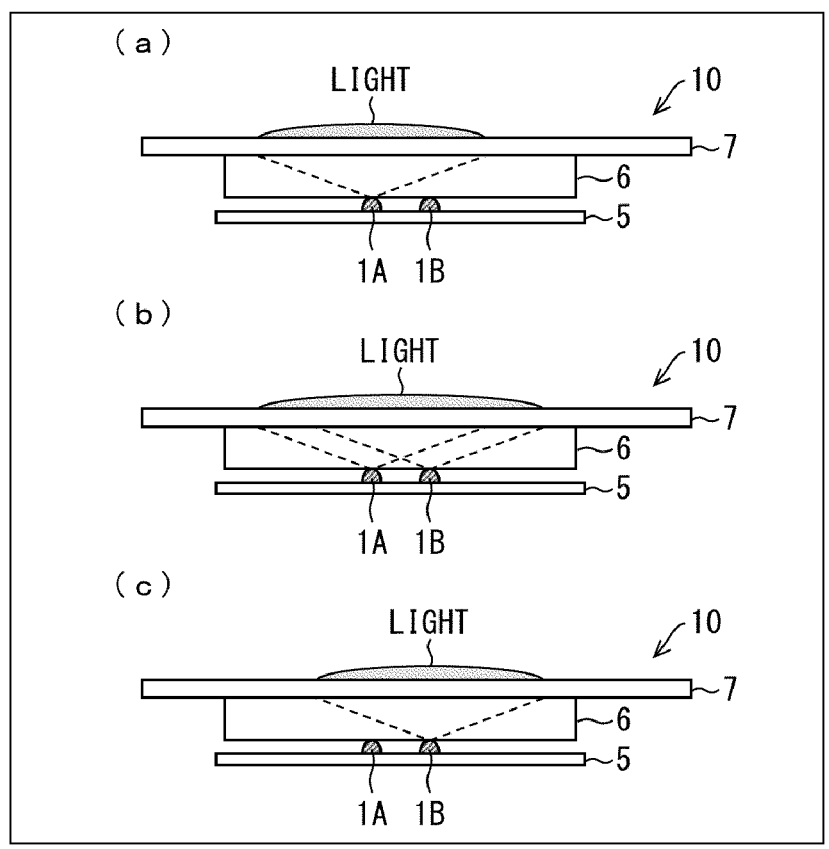

(a) through (c) of FIG. 2 are views each illustrating a light emitting state of the illumination device in accordance with Embodiment 1.

Figure 3:
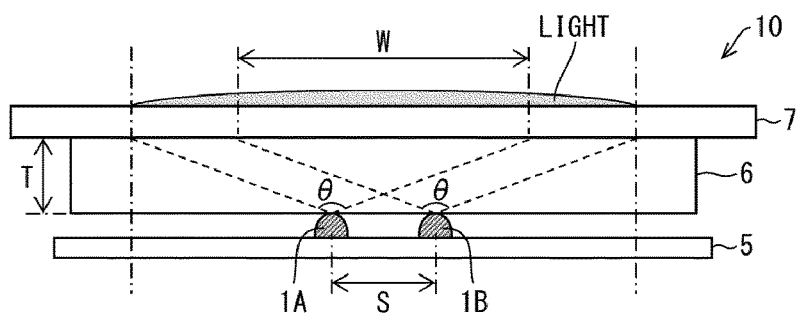

FIG. 3 is a view for describing a condition under which to cause a beam of light which beam is emitted from a first LED and a beam of light which beam is emitted from a second LED to overlap in part in a projection section.

Figure 4:
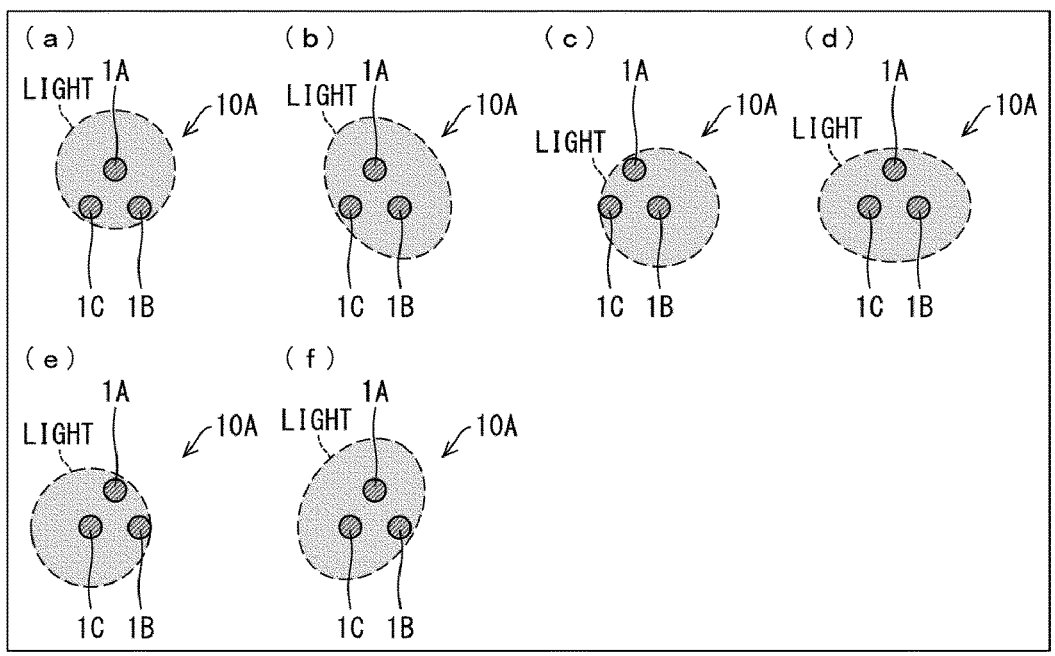

(a) through (f) of FIG. 4 are views each showing an example of a light emitting state of another illumination device in accordance with Embodiment 1.

Figure 5:
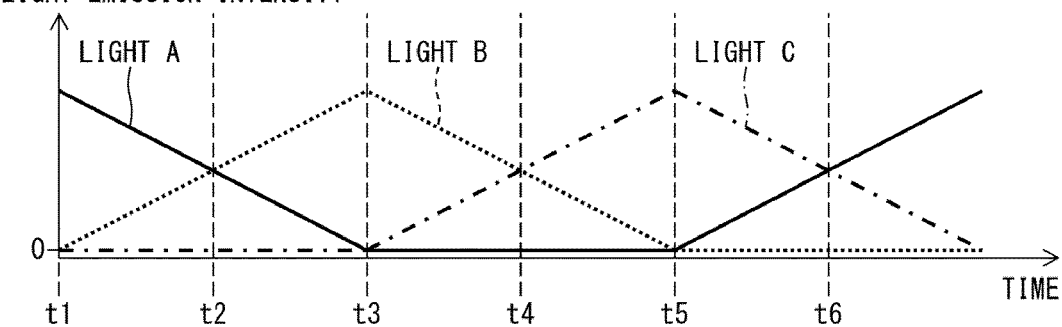

FIG. 5 is a view showing an example of a sequence of light emission control with respect to the first LED through a third LED in another light emitting device in accordance with Embodiment 1.

Figure 6:
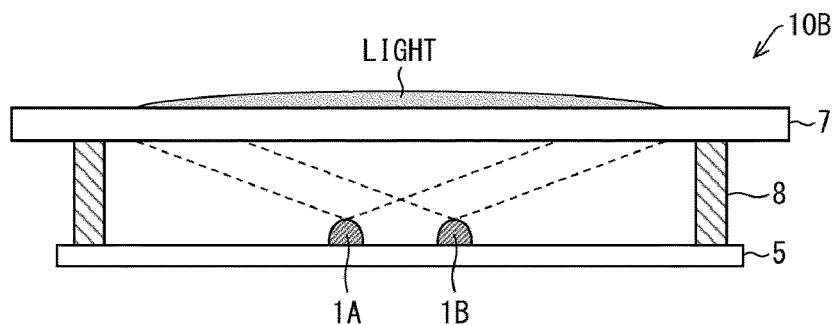

FIG. 6 is a view illustrating a configuration of an illumination device in accordance with a variation of Embodiment 1 of the present invention.

Figure 7:
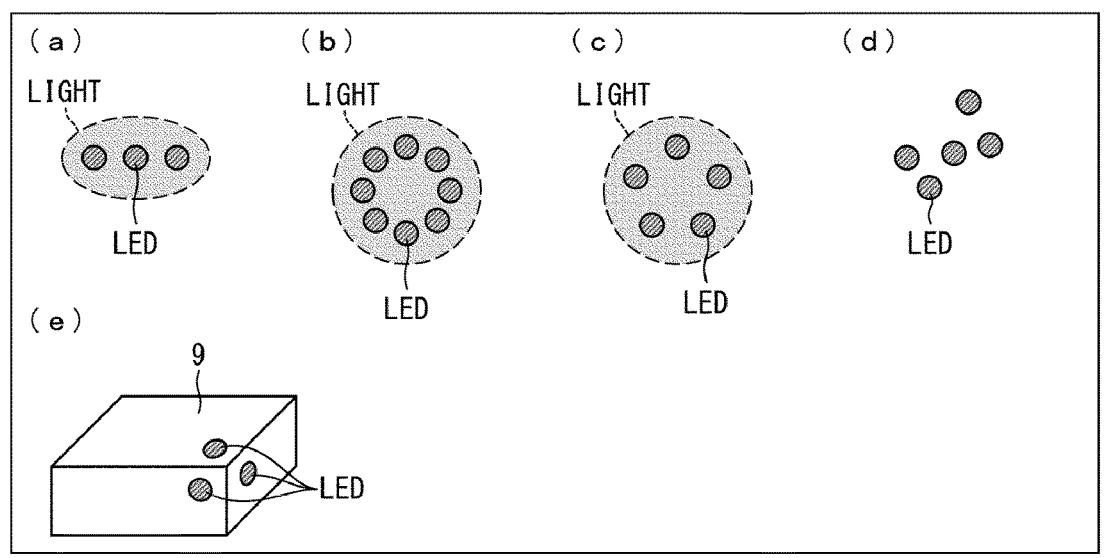

(a) through (e) of FIG. 7 are views each illustrating a variation of an arrangement of LEDs of the illumination device in accordance with Embodiment 1.

Figure 8:
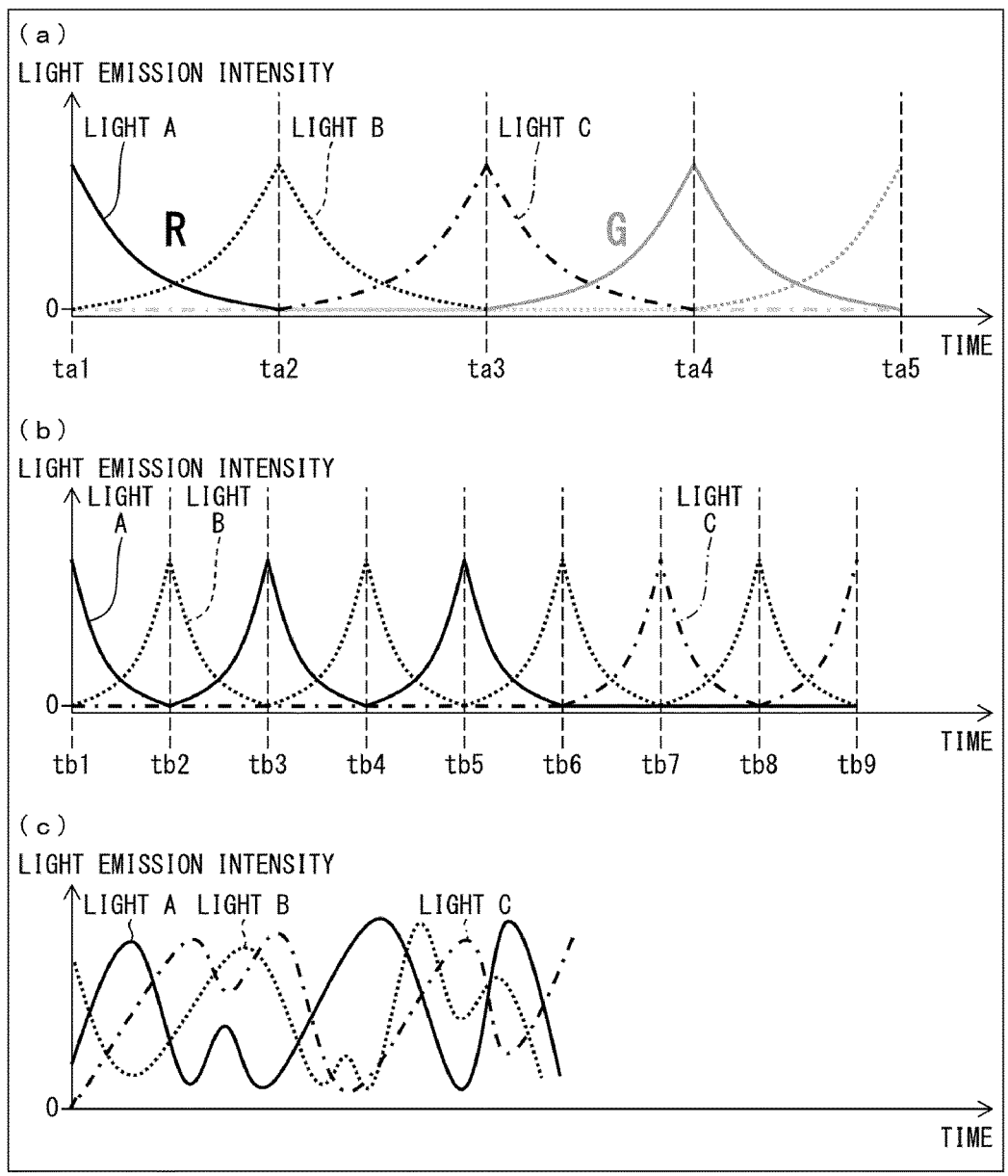

(a) through (c) of FIG. 8 are views each showing an example of a sequence of light emission control with respect to a first LED through a third LED of Embodiment 2.

Figure 9:
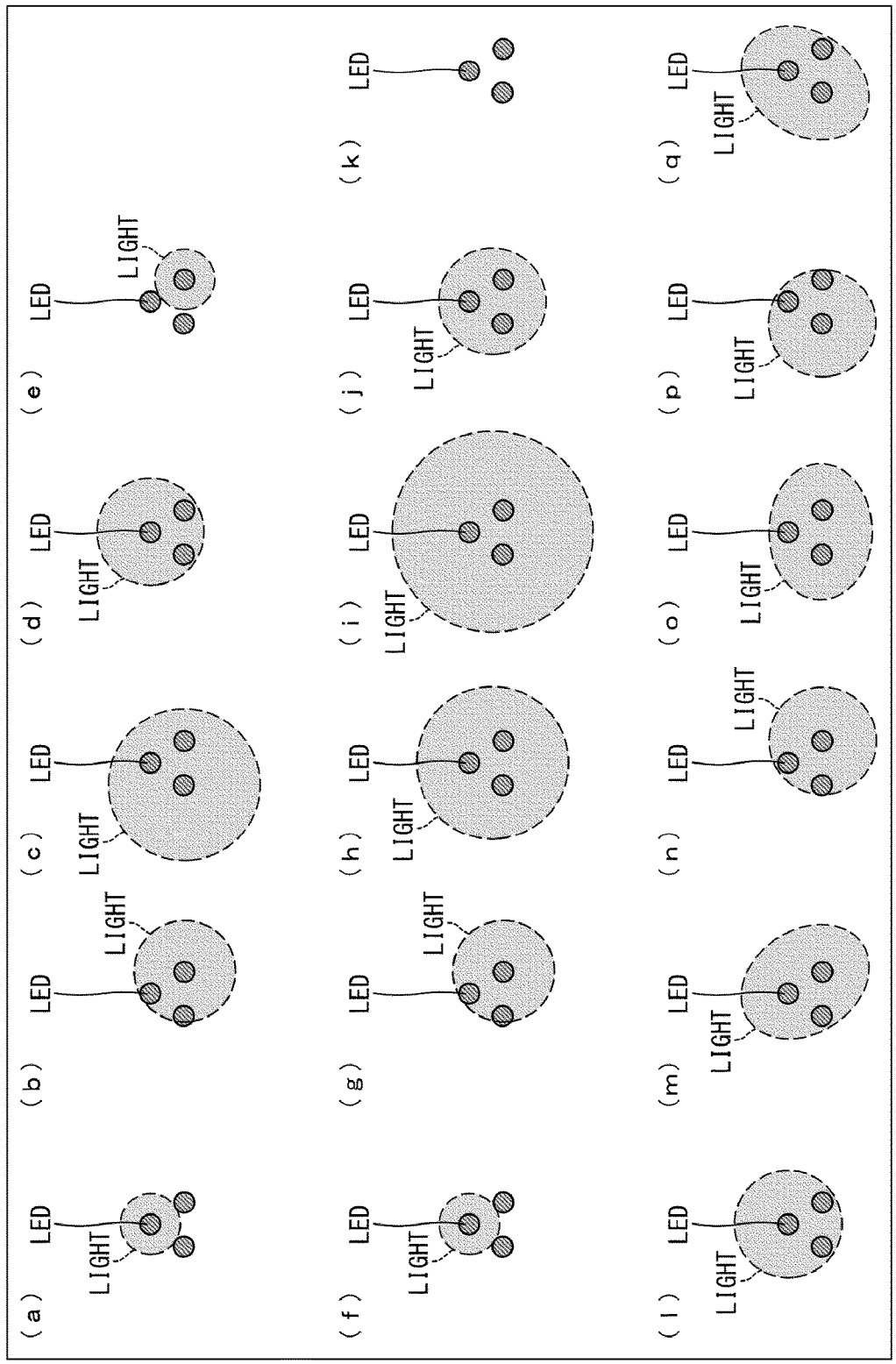

(a) through (q) of FIG. 9 are views each describing light emission control different from the light emission control of FIG. 8.

Figure 10:
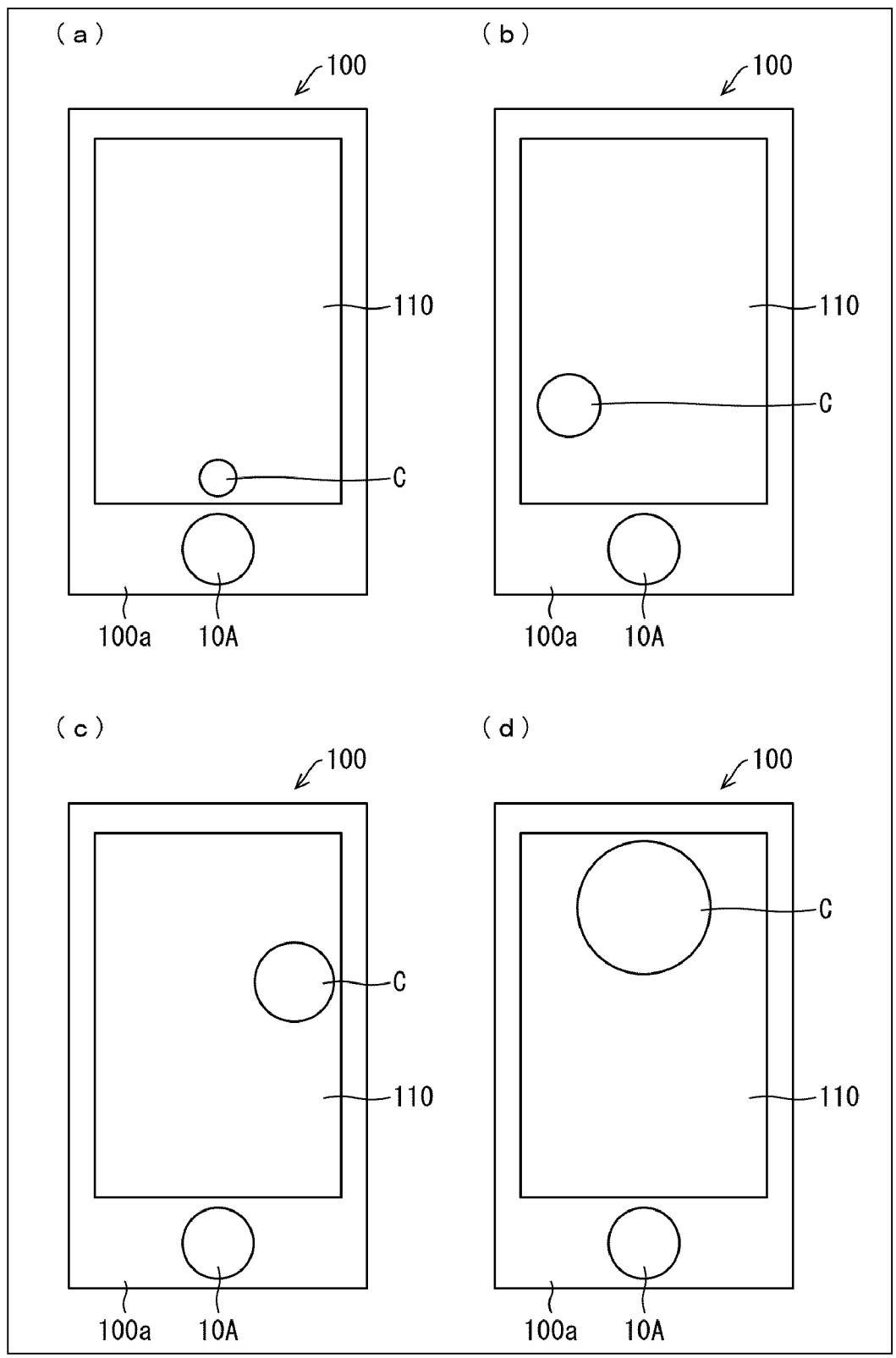

(a) through (d) of FIG. 10 are views each showing an example of how a moving image display is carried out by a smartphone in accordance with Embodiment 3.

Figure 11:
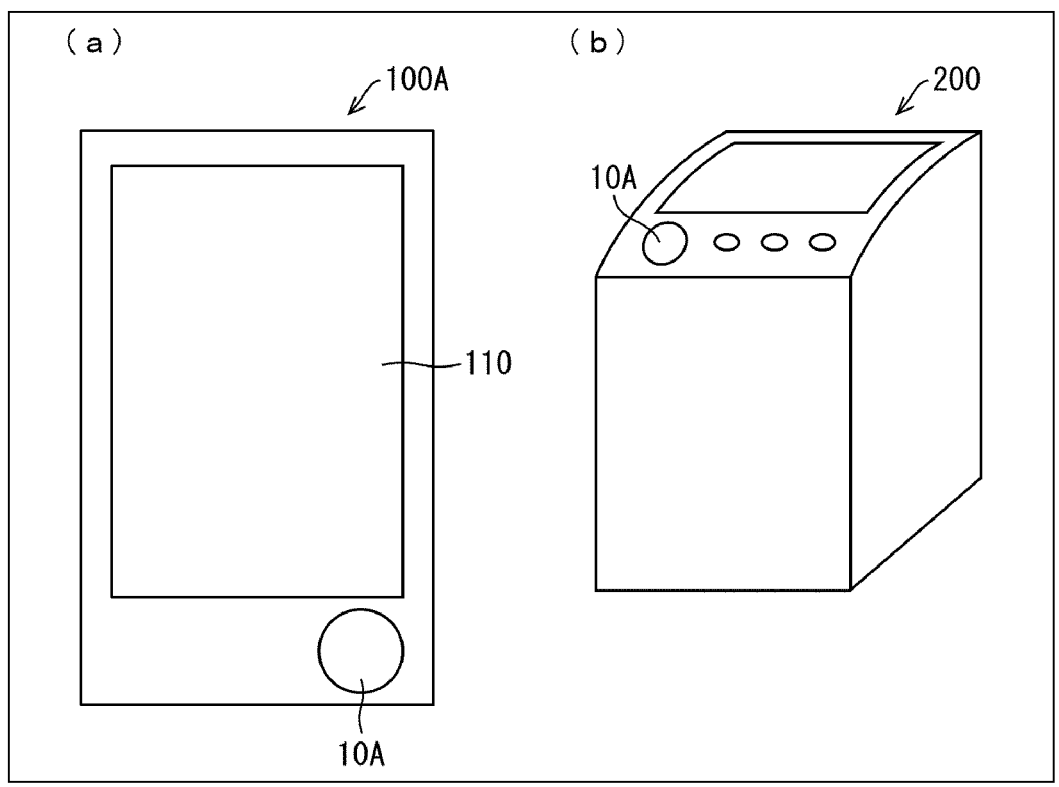

(a) of FIG. 11 is a view illustrating an appearance of a mobile terminal serving as another example of an electronic device in accordance with Embodiment 3. (b) of FIG. 11 is a view illustrating an appearance of a washing machine serving as still another example of the electronic device in accordance with Embodiment 3.

DESCRIPTION OF EMBODIMENTS

Embodiment 1

Figure 1:
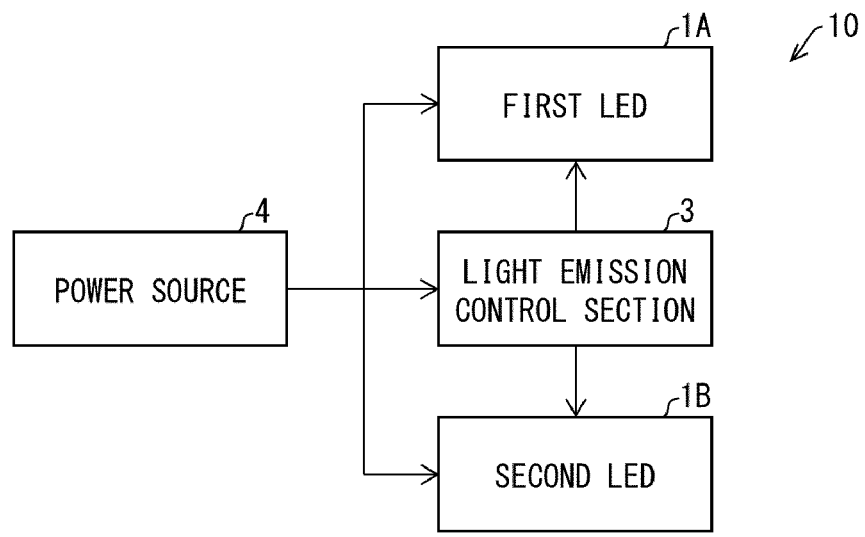
FIG. 1 is a functional block diagram illustrating a configuration of an illumination device in accordance with Embodiment 1 of the present invention.

Embodiment 1 of the present invention is specifically described below with reference to FIGS. 1 through 7. First, a configuration of an illumination device 10 of Embodiment 1 will be described with reference to FIGS. 1 and 2. FIG. 1 is a functional block diagram illustrating the configuration of the illumination device 10. (a) through (c) of FIG. 2 are views each illustrating a light emitting state of the illumination device 10.

(Configuration of Illumination Device 10)

As illustrated in FIGS. 1 and 2, the illumination device 10 includes a first light emitting diode (LED) 1A (light source), a second LED 1B (light source), a light emission control section 3, a power source 4, a substrate 5, a diffusion section 6, and a projection section 7. Each of the first LED 1A and the second LED 1B is a light source of the illumination device 10. For example, each of the first LED 1A and the second LED 1B is a monochromatic LED that emits red light. Each of the first LED 1A and the second LED 1B is hereinafter also expressed merely as an LED as appropriate.

The light emission control section 3 controls LEDs so as to temporally change intensities of beams of light which beams are emitted from the respective LEDs. Specifically, the light emission control section 3 controls a magnitude of an electric current that flows through each of the LEDs. The power source 4 supplies electric power to the LEDs and the light emission control section 3. The substrate 5 is a supporting member configured to support the LEDs. The first LED 1A and the second LED 1B are provided on a single surface of the substrate 5.

The diffusion section 6 diffuses light that is emitted from an LED. The diffusion section 6 is provided between the LEDs and the projection section 7. The diffusion section 6 can be a light guide plate, a diffuser, or a transparent plate. The light guide plate can be a plate-like member made of a light-transparent resin, such as acrylic resin. The diffuser can be obtained by cut-processing a plate-like member made of a resin such as acrylic resin, or by processing such a plate-like member into a form of ground glass. The transparent plate can be a plate made of, for example, glass or a resin.

On the projection section 7, light that is emitted from an LED is to be projected. As illustrated in (b) of FIG. 2, beams of light which beams are emitted from the respective LEDs overlap in part in the projection section 7. The projection section 7 is made of glass or a resin, or is made of the glass or the resin which is painted in any color (e.g., white). The projection section 7 can be made of a single material of which the diffusion section 6 is made.

(Light Emitting State of LED)

As illustrated in (a) through (c) of FIG. 2, the illumination device 10 can achieve, for example, the following three light emitting states.

Light emitting state 1a: a state in which only the first LED 1A emits light ((a) of FIG. 2)

Light emitting state 1b: a state in which both the first LED 1A and the second LED 1B emit light ((b) of FIG. 2)

Light emitting state 1c: a state in which only the second LED 1B emits light ((c) of FIG. 2)

Note here that in the light emitting states 1a and 1c, a beam of light which beam is emitted from the first LED 1A (hereinafter referred to as "light A") and a beam of light which beam is emitted from the second LED 1B (hereinafter referred to as "light B") are projected on the projection section 7 in respective different places in the projection section 7. In the light emitting state 1b, the light A and the light B overlap in part in the projection section 7. Note that light projected on the projection section 7 is also referred to as projection light.

(Example of Configuration for Overlapping of Beams of Light)

The first LED 1A and the second LED 1B are provided on the substrate 5 so that the light A and the light B overlap in part in the projection section 7. FIG. 3 is a view for describing a condition under which to cause the light A and the light B to overlap in part in the projection section 7. The condition is described below with reference to FIG. 3. In FIG. 3, W represents a width of a part (overlapping part) of the projection section 7 in which part the light A and the light B overlap. S represents a distance between the first LED 1A and the second LED 1B. T represents a thickness of the diffusion section 6. θ represents an angle of radiation. Note that the angle of radiation refers to an angle at which light that is emitted from an LED spreads to the projection section 7.

For example, an angle of radiation of the first LED 1A refers to an angle formed by lines each of which connects, on a plane including the first LED 1A and perpendicular to the projection section 7, the first LED 1A and a corresponding one of both ends of an image that is formed from the light A projected. Note that for description, FIG. 3 shows, as an example, a case where a straight line that connects the first LED 1A and the second LED 1B is parallel to a surface of the page on which FIG. 3 is illustrated, the angle of radiation of the first LED 1A and an angle of radiation of the second LED 1B are equal, and projection light has a conical shape whose vertex is a point at which the LED emits light. Note, however, that an arrangement of the LEDs, the respective angles of radiation of the LEDs, and a shape of the projection light are not limited to those of the above case.

In FIG. 3, the width W is expressed by the following Equation (1):

$$W = 2 \times T \times \tan(\theta/2) - S \qquad (1)$$

In the above Equation (1), in a case where W>0, the light A and the light B overlap in part in the projection section 7 in the light emitting state 1b (described earlier). That is, the overlapping part is formed in the projection section 7.

Note that according to an illumination device including three or more LEDs (e.g., an illumination device 10A (described later)), at least two of those LEDs are provided so that beams of light which beams are emitted from the respective at least two LEDs overlap in part in the projection section 7. That is, a light emitting device is configured so that the at least two LEDs satisfy W>0. Note that from the viewpoint of expressiveness of light (described later), an area of the overlapping part is preferably set so as to be somewhat large. For example, the area of the overlapping part can be set so as to be approximately 30% to 50% of an area (projected area) of light that is emitted from a single LED and projected on the projection section 7.

(Example of Light Emission Control)

The following description discusses an example in which a sequence of light emission control is implemented in a case where an illumination device includes three light sources. Note that such a light emitting device is referred to as the illumination device 10A so as to be distinguished from the illumination device 10 (described earlier). (a) through (f) of FIG. 4 are views each showing an example of a light emitting state of the illumination device 10A. The illumination device 10A is obtained by causing the illumination device 10 (described earlier) to further include a third LED (light source) 1C, which is a monochromatic LED that emits red light. Note that no components of the illumination device 10A except the first LED 1A through the third LED 1C are illustrated in (a) through (f) of FIG. 4.

According to the illumination device 10A, the first LED 1A, the second LED 1B, and the third LED 1C are provided clockwise in this order at respective vertices of an imaginary triangle on the substrate 5. Note here that a beam of light which beam is emitted from the third LED 1C is referred to as light C. The first LED 1A through the third LED 1C are provided so that the light A, the light B, and the light C overlap in part in the projection section 7.

As illustrated in (a) through (f) of FIG. 4, the illumination device 10A can achieve, for example, the following six light emitting states.

Light emitting state 2a: a state in which only the first LED 1A emits light ((a) of FIG. 4)

Light emitting state 2b: a state in which the first LED 1A and the second LED 1B emit light ((b) of FIG. 4)

Light emitting state 2c: a state in which only the second LED 1B emits light ((c) of FIG. 4)

Light emitting state 2d: a state in which the second LED 1B and the third LED 1C emit light ((d) of FIG. 4)

Light emitting state 2e: a state in which only the third LED 1C emits light ((e) of FIG. 4)

Light emitting state 2f: a state in which the third LED 1C and the first LED 1A emit light ((f) of FIG. 4)

In a case where these light emitting states 2a through 2f are repeated in order, projection light moves so as to rotate clockwise on the projection section 7.

FIG. 5 is a graph showing an example of a sequence of light emission control with respect to the first LED 1A through the third LED 1C in the illumination device 10A. In FIG. 5, a horizontal axis shows time, and a vertical axis shows an intensity of light that is emitted from each of the LEDs (a light emission intensity of each of the LEDs). In FIG. 5, an intensity of the light A is shown by a solid line, an intensity of the light B is shown by a broken line, and an intensity of the light C is shown by a dotted and dashed line. Note that the intensities of the light A, the light B, and the light C are shown by the respective lines above also in a later drawing, i.e., FIG. 8.

Note also that the vertical axis of FIG. 5 can be read as an electric current flowing through each of the LEDs. This is because an intensity of light is substantially proportional to an electric current flowing through an LED. In FIG. 5, a light emission intensity (i.e., an electric current) temporally increases and decreases linearly. Note, however, that a light emission intensity can alternatively temporally increase and decrease nonlinearly as shown later in FIG. 8. In FIGS. 5 and 8, a predetermined minimum value of an intensity of light is set at 0 (zero). Alternatively, the predetermined minimum value can be set at a value greater than 0.

As described below, the light emission control section 3 sets a period in which at least two LEDs simultaneously illuminate, and the light emission control section 3 changes, in the period, intensities of beams of light which beams are emitted by the respective LEDs. Such light emission control allows the overlapping part to be formed in the projection section 7. This makes it possible to change a shape of an image that is formed in the projection section 7 from projection light. The following description discusses the sequence of FIG. 5.

At a time t1, the light emission control section 3 maximizes the intensity of the light A and causes each of the respective intensities of the light B and the light C to be 0. This brings about the light emitting state 2a at the time t1. Subsequently, the light emission control section 3 decreases the intensity of the light A, increases the intensity of the light B, and maintains the intensity of the light C at 0. This causes the intensity of the light A and the intensity of the light B to be equal at a time t2. This brings about the light emitting state 2b at the time t2.

Then, at a time t3, the light emission control section 3 causes each of the respective intensities of the light A and the light C to be 0 and maximizes the intensity of the light B. This brings about the light emitting state 2c at the time t3. Subsequently, the light emission control section 3 decreases the intensity of the light B, increases the intensity of the light C, and maintains the intensity of the light A at 0. This causes the intensity of the light B and the intensity of the light C to be equal at a time t4. This brings about the light emitting state 2d at the time t4.

Then, at a time t5, the light emission control section 3 causes each of the respective intensities of the light A and the light B to be 0 and maximizes the intensity of the light C. This brings about the light emitting state 2e at the time t5. Subsequently, the light emission control section 3 decreases the intensity of the light C, increases the intensity of the light A, and maintains the intensity of the light B at 0. This causes the intensity of the light C and the intensity of the light A to be equal at a time t6. This brings about the light emitting state 2f at the time t6. Note that the light emitting state 2f is followed by the light emitting state 2a and processes identical to those described above are repeatedly carried out. The light emitting states 2a through 2f are thus repeated.

(Effects of Illumination Devices 10 and 10A)

As described earlier, the illumination device 10 makes it possible to achieve the three light emitting states 1a through 1c. In this case, it is possible to change, in each of the light emitting states 1a through 1c, a shape of an image that is formed in the projection section 7 from light projected on the projection section 7 (projection light).

That is, by changing a light emitting state 1 to a light emitting state 3 via a light emitting state 2 in a predetermined time period, it is possible to produce movement or the like in projection light (a cluster of beams of light) without the need to mechanically change respective locations of the first LED 1A and the second LED 1B. This thus allows light to be more expressive by a simple configuration. Furthermore, the illumination device 10 makes it possible to more reliably cause overlapping of beams of light in the projection section 7 by causing the diffusion section 6 to diffuse the light A and the light B.

Moreover, an illumination device which includes more LEDs makes it possible to achieve a wider variety of light emitting states and consequently to allows light to be still more expressive. For example, the illumination device 10A which includes three LEDs makes it possible to achieve the six light emitting states 2a through 2f.

The description of the illumination device 10A which includes three LEDs, the description being provided in FIGS. 4 and 5, assumes that up to two LEDs emit light simultaneously. Note, however, that the number of LEDs which emit light simultaneously does not necessarily need to be up to two. The light emission control section 3 can alternatively control the LEDs so as to cause three LEDs to emit light simultaneously. Specifically, in order that at least any one of a size, a location, and a shape of the overlapping part of the projection section 7 is temporally changed, the light emission control section 3 only needs to change intensities of beams of light which beams are emitted from the respective LEDs.

[Variation]

(Configuration in which No Diffusion Section is Provided)

FIG. 6 is a view illustrating a configuration of an illumination device 10B in accordance with a variation of Embodiment 1. The illumination device 10B differs from the illumination device 10 in that the illumination device 10B includes no diffusion section 6 and includes a spacer 8 which causes LEDs and a projection section 7 to be spaced. The spacer 8 is provided between a substrate 5 and the projection section 7. The spacer 8 is greater in height than the LEDs. This provides, between the LEDs and the projection section 7, a space whose height (width) is equal to a difference between the height of the spacer 8 and the height of the LEDs.

Thus, light A and light B are diffused while passing through the space toward the projection section 7. That is, the space can function as a diffusion section. Also in a case where the illumination device 10B includes the spacer 8 instead of including a diffusion section in a form of a tangible object (member), it is possible to more reliably cause overlapping of beams of light in the projection section 7.

(Variation of LEDs)

As described earlier, according to the illumination device 10A, each of the first LED 1A through the third LED 1C is a monochromatic LED that emits red light only. Note, however, that an illumination device in accordance with an aspect of the present invention can include at least one multicolor LED that is capable of emitting light of two or more colors. For example, each of the first LED 1A through the third LED 1C can be a three-color LED that is capable of emitting light of three colors, which are red, green, and blue. Use of a multicolor LED as a light source makes it easy to (i) change colors of light and (ii) adjust an intensity of the light. Alternatively, the first LED 1A through the third LED 1C can be LEDs that emit light of respective different colors. For example, the first LED 1A can be a green LED that emits green light, the second LED 1B can be a blue LED that emits blue light, and the third LED 1C can be a red LED that emits red light.

(Variation of Arrangement of LEDs)

As illustrated in FIG. 3, the illumination device 10 includes two LEDs that are spaced at the distance S. Furthermore, as illustrated in FIG. 4, the illumination device 10A includes three LEDs which are provided at respective vertices of an imaginary triangle. Note, however, that the number and an arrangement of LEDs of an illumination device in accordance with an aspect of the present invention are not limited to those of the illumination device 10A. (a) through (e) of FIG. 7 are views each illustrating a variation of an arrangement of LEDs of an illumination device in accordance with an aspect of the present invention.

(a) through (d) of FIG. 7 each show an example in which a plurality of LEDs is two-dimensionally arranged. (a) of FIG. 7 shows an example in which three LEDs are linearly arranged, i.e., arranged on an imaginary straight line. (b) of FIG. 7 shows an example in which eight LEDs are circularly arranged, i.e., arranged on an imaginary circumference. (c) of FIG. 7 shows an example in which five LEDs are polygonally arranged, i.e., arranged on respective vertices of an imaginary polygon (pentagon). (d) of FIG. 7 shows an example in which five LEDs are randomly arranged. The arrangements of (b) and (c) of FIG. 7 are suitable for expression of light such that the light two-dimensionally rotates.

Alternatively, an illumination device in accordance with an aspect of the present invention can include a plurality of LEDs that is three-dimensionally arranged. In a case where a plurality of LEDs is three-dimensionally arranged, light can be three-dimensionally expressed. (e) of FIG. 7 is a view showing an example in which LEDs are provided on respective three surfaces of a supporting member 9, which is a rectangular parallelepiped. As illustrated in (e) of FIG. 7, a plurality of LEDs can be provided on at least two surfaces of the supporting member 9. Note, however, that the supporting member 9 does not necessarily need to be a rectangular parallelepiped but only needs to have any three-dimensional shape. Note also that a plurality of LEDs only needs to be provided on at least two of surfaces that are present at or near a corner of the supporting member 9. The LEDs which are thus provided can be easily fixed in a case where light is three-dimensionally expressed. In addition, the LEDs which are thus provided make it easy to position the LEDs and other member(s) (in particular, the projection section 7).

Embodiment 2

Embodiment 2 of the present invention is specifically described below with reference to FIGS. 8 and 9. Note that, for convenience, members having functions identical to those of the respective members described in Embodiment 1 are given respective identical reference signs, and a description of those members is omitted here.

As described earlier, a sequence of light emission control with respect to LEDs is not limited to the sequence of FIG. 5. The following description discusses a variation of a sequence of light emission control with reference to FIG. 8. (a) through (c) of FIG. 8 are each a graph showing an example of a sequence of light emission control with respect to a first LED 1A through a third LED 1C in Embodiment 2.

(First Example of Light Emission Control)

(a) of FIG. 8 shows a first example of light emission control. As described below, the light emission control makes it possible to express light such that the light flickers. The following description discusses, for example, a case where the light emission control is carried out in an illumination device that includes three multicolor LEDs which are provided at respective vertices of an imaginary triangle and each of which is capable of emitting light of at least two colors, which are red and green.

In the following description, the three multicolor LEDs are referred to as a fourth LED, a fifth LED, and a sixth LED, respectively. Note that a beam of light which beam is emitted from the fourth LED is referred to as light A, a beam of light which beam is emitted from the fifth LED is referred to as light B, and a beam of light which beam is emitted from the sixth LED is referred to as light C. Note also that the light A through the light C each have a color of red (R) in their respective initial states.

At a time ta1, a light emission control section 3 maximizes an intensity of the light A and causes each of respective intensities of the light B and the light C to be 0. Subsequently, the light emission control section 3 decreases the intensity of the light A, increases the intensity of the light B, and maintains the intensity of the light C at 0.

Then, at a time ta2, the light emission control section 3 causes each of the respective intensities of the light A and the light C to be 0 and maximizes the intensity of the light B. Subsequently, the light emission control section 3 decreases the intensity of the light B, increases the intensity of the light C, and maintains the intensity of the light A at 0.

Then, at a time ta3, the light emission control section 3 causes each of the respective intensities of the light B and the light A to be 0 and maximizes the intensity of the light C. Furthermore, the light emission control section 3 changes the color of the light A from red to green (G) at the time ta3. Subsequently, the light emission control section 3 decreases the intensity of the light C, increases the intensity of the light A, and maintains the intensity of the light B at 0.

Then, at a time ta4, the light emission control section 3 causes each of the respective intensities of the light C and the light B to be 0 and maximizes the intensity of the light A. Furthermore, the light emission control section changes the color of the light B from red to green at the time ta4. Subsequently, the light emission control section 3 decreases the intensity of the light A, increases the intensity of the light B, and maintains the intensity of the light C at 0.

Then, at a time ta5, the light emission control section 3 causes each of the respective intensities of the light A and the light C to be 0 and maximizes the intensity of the light B. Furthermore, the light emission control section 3 changes the color of the light C from red to green at the time ta5. Thereafter, similarly, the light emission control section 3 repeatedly increases and decreases respective light emission intensities of the LEDs and changes colors of beams of light which beams are emitted from the respective LEDs. With the configuration, while causing light that is projected on a projection section 7 to rotate, it is possible to change the colors of the light so that the colors alternate between red and green.

Assume that each of the fourth LED through the sixth LED is an LED that is capable of emitting not only light of two colors, which are red and green, but also light of another color that is different from red and green. In this case, the colors, including the another color, of light can be changed in order. In FIG. 5 (described earlier), the light emission control section 3 increases and decreases the respective light emission intensities of the LEDs at a constant rate of change. Meanwhile, in (a) of FIG. 8, the light emission control section 3 carries out light emission control so that a light emission intensity which is currently higher is changed at a higher rate.

As described above, the light emission control section 3 increases and decreases, in order, the intensities of the beams of light which beams are emitted by the respective LEDs. The light emission control section 3 decreases, to a minimum value, an intensity of light that is emitted by each of the LEDs, then changes a color of the light, and increases the intensity of the light from the minimum value. Such light emission control makes it possible to express light such that the light flickers, i.e., such that a color of the light is changed while the light is gently moving on the projection section 7. Note that a configuration of an illumination device in which the light emission control is carried out is not limited to the above example. That is, in a case where at least one of a plurality of light sources of an illumination device is a multicolor LED, light emission control identical to the light emission control of (a) of FIG. 8 can be carried out with respect to the multicolor LED.

Furthermore, a timing of change of a color of light that is emitted from each of the LEDs is also not limited to the above example. For example, the light emission control section 3 can be configured to increase, to a maximum value, an intensity of light that is emitted by each of the LEDs, then changes a color of the light, and decreases the intensity of the light from the maximum value. Furthermore, the light emission control section 3 can be configured to change a color of light whose intensity is being increased or decreased. That is, the light emission control section 3 only needs to change, at a predetermined timing, at least either colors or the intensities of light that is emitted from each of the LEDs.

(Second Example of Light Emission Control)

(b) of FIG. 8 shows a second example of light emission control. As described below, the light emission control makes it possible to express light that crawls like a living organism. Note that an arrangement of three LEDs and colors of beams of light which beams are emitted from the respective LEDs are not particularly limited.

In the following description, the three LEDs are referred to as a seventh LED, an eighth LED, and a ninth LED, respectively. Note that a beam of light which beam is emitted from the seventh LED is referred to as the light A, a beam of light which beam is emitted from the eighth LED is referred to as the light B, and a beam of light which beam is emitted from the ninth LED is referred to as the light C.

At a time tb1, the light emission control section 3 maximizes the intensity of the light A and causes each of the respective intensities of the light B and the light C to be 0. Subsequently, the light emission control section 3 decreases the intensity of the light A, increases the intensity of the light B, and maintains the intensity of the light C at 0. Then, at a time tb2, the light emission control section 3 maximizes the intensity of the light B and causes each of the respective intensities of the light C and the light A to be 0.

After the time tb2, the above two light emitting states are repeated at a time tb3, a time tb4, a time tb5, and a time tb6. As illustrated in (b) of FIG. 8, at each of the times tb3 and tb5, the respective light emission intensities of the LEDs are identical to those at the time tb1. Meanwhile, at each of the times tb4 and tb6, the respective light emission intensities of the LEDs are identical to those at the time tb2.

After the time tb6, the light emission control section 3 decreases the intensity of the light B, increases the intensity of the light C, and maintains the intensity of the light A at 0. Then, at a time tb7, the light emission control section 3 maximizes the intensity of the light C and causes each of the respective intensities of the light A and the light B to be 0. After the time tb7, the above two light emitting states are repeated at a time tb8 and a time tb9, respectively.

According to such light emission control, it is possible to cause a cluster of beams of light that is projected on the projection section 7 to move backward and forward between a location corresponding to the seventh LED and a location corresponding to the eighth LED first and then move backward and forward between a location corresponding to the eighth LED and a location corresponding to the ninth LED. Thus, it is possible to achieve expression such that light that is projected on the projection section 7 crawls like a living organism.

(Third Example of Light Emission Control)

(c) of FIG. 8 shows a third example of light emission control. As described below, the light emission control makes it possible to express light like a flickering flame. Note that the light emission control can be carried out in an illumination device that includes three LEDs. Note also that an arrangement of the three LEDs and colors of beams of light which beams are emitted from the respective LEDs are not particularly limited.

According to the light emission control, the light emission control section 3 changes respective light emission intensities of the LEDs by use of a random number algorithm such as a 1/f fluctuation. This causes the respective light emission intensities of the LEDs to randomly fluctuate, so that light like a flickering flame can be expressed.

(Another Example of Light Emission Control)

(a) through (q) of FIG. 9 are views each describing another example of light emission control different from the light emission control illustrated in each of (a) through (c) of FIG. 8. In (a) through (q) of FIG. 9, a small circle drawn with a solid line indicates a location of an LED, and a circle drawn with a broken line indicates projection light. Furthermore, a size of a circle drawn with a broken line indicates a light emission intensity of an LED (in a case where a plurality of LEDs simultaneously emits light, a size of a circle drawn with a broken line indicates a sum total of light emission intensities of the plurality of LEDs). In a case where the LEDs are turned on and off in accordance with transition of the light emitting states in the light emission control illustrated in each of (a) through (q) of FIG. 9, the light emission intensities of the LEDs are desirably continuously changed.

(Fourth Example of Light Emission Control)

First, a fourth example of light emission control is described below with reference to (a) through (e) of FIG. 9. (a) through (e) of FIG. 9 illustrate respective light emitting states 3a through 3e below.

Light emitting state 3a: a state in which a first LED emits light at a low intensity ((a) of FIG. 9)

Light emitting state 3b: a state in which a second LED emits light at a moderate intensity ((b) of FIG. 9)

Light emitting state 3c: a state in which a third LED emits light at a high intensity ((c) of FIG. 9)

Light emitting state 3d: a state in which the first LED emits light at a moderate intensity ((d) of FIG. 9)

Light emitting state 3e: a state in which the second LED emits light at a low intensity ((e) of FIG. 9)

In the light emission control, the light emitting states 3a through 3e are changed in this order. Note that the light emitting state 3e is followed by the light emitting state 3a and processes identical to those described above are repeatedly carried out. The light emission control makes it possible to increase and decrease an intensity of projection light while causing the projection light to rotate. Note that the light emission control can alternatively be carried out so that the rotation of the projection light is reversed at any timing. In a case where each of the LEDs is a multicolor LED, a color of light can be changed at any timing during the sequence.

(Fifth Example of Light Emission Control)

Next, a fifth example of light emission control is described below with reference to (f) through (k) of FIG. 9. (f) through (k) of FIG. 9 illustrate respective light emitting states 3f through 3k below.

Light emitting state 3f: a state in which the first LED emits light at a low intensity ((f) of FIG. 9)

Light emitting state 3g: a state in which the second LED emits light at a moderate intensity ((g) of FIG. 9)

Light emitting state 3h: a state in which the first LED through the third LED each emit light at a high intensity ((h) of FIG. 9)

Light emitting state 3i: a state in which the first LED through the third LED each emit light at a higher intensity ((i) of FIG. 9)

Light emitting state 3j: a state in which the first LED through the third LED each emit light at a moderate intensity ((j) of FIG. 9)

Light emitting state 3k: a state in which the first LED through the third LED each emit light at an intensity of 0 ((k) of FIG. 9)

In the light emission control, the light emitting states 3f through 3k are changed in this order. Note that the light emitting state 3k is followed by the light emitting state 3f and processes identical to those described above are repeatedly carried out. According to the light emission control, in a case where the respective light emission intensities of the LEDs are increased while projection light is caused to rotate and each of the respective light emission intensities of the LEDs reaches a value that is not less than a predetermined value, a sum total of the light emission intensities can be increased and decreased in a state in which all the LEDs are equal in light emission intensity.

(Sixth Example of Light Emission Control)

Next, a sixth example of light emission control is described below with reference to (l) through (q) of FIG. 9. (l) through (k) of FIG. 9 illustrate respective light emitting states 3l through 3q below.

Light emitting state 3l: a state in which the first LED emits light ((l) of FIG. 9)

Light emitting state 3m: a state in which the first LED and the second LED emit light ((m) of FIG. 9)

Light emitting state 3n: a state in which the second LED emits light ((n) of FIG. 9)

Light emitting state 3o: a state in which the second LED and the third LED emit light ((o) of FIG. 9)

Light emitting state 3p: a state in which the third LED emits light ((p) of FIG. 9)

Light emitting state 3q: a state in which the third LED and the first LED emit light ((q) of FIG. 9)

The light emitting states 3l and 3m are equal in light emission intensity of the first LED. The light emitting states 3n and 3o are equal in light emission intensity of the second LED. The light emitting states 3p and 3q are equal in light emission intensity of the third LED. In the light emission control, the light emitting states 3l and 3m are alternately repeated. Subsequently, the light emitting states 3n and 3o are alternately repeated. Thereafter, the light emitting states 3p and 3q are alternately repeated.

According to the light emission control, (i) a movement of the projection light such that the projection light repeatedly expands and contracts from a location corresponding to the first LED toward a location corresponding to the second LED, (ii) a movement of the projection light such that the projection light repeatedly expands and contracts from the location corresponding to the second LED toward a location corresponding to the third LED, and (iii) a movement of the projection light such that the projection light repeatedly expands and contracts from the location corresponding to the third LED toward the location corresponding to the first LED are expressed in order. That is, a movement of the projection light (a cluster of beams of light) such that the projection light moves while repeatedly expanding and contracting is expressed.

Embodiment 3

Embodiment 3 of the present invention is specifically described below with reference to FIGS. 10 and 11. (a) through (d) of FIG. 10 are views each showing an example in which a moving image (image) is displayed by a smartphone 100 (electronic device) of Embodiment 3.

The smartphone 100 includes an image display surface 100a, a display 110 (display section), and an illumination device 10A. The display 110 and the illumination device 10A are provided on the image display surface 100a so as to be adjacent to each other. The smartphone 100 causes the display 110 to display a moving image in conjunction with expression of light by the illumination device 10A. The following description discusses an example of how a moving image display is carried out by the smartphone 100. Note that a first side of the display 110 which first side is adjacent to the illumination device 10A is referred to as a lower side and a second side of the display 110 which second side is opposite from the first side which is adjacent to the illumination device 10A is referred to as an upper side.

First, the illumination device 10A emits light in accordance with the light emission control of (c) of FIG. 8 (described earlier). Then, while carrying out the light emission control, the smartphone 100 changes a moving image to be displayed on the display 110. First, as illustrated in (a) of FIG. 10, the smartphone 100 causes a circle C which has an appearance of a soap bubble to be displayed on the lower side of the display 110.

Next, as illustrated in (b) through (d) of FIG. 10 in order, the smartphone 100 increases a size of the circle C on the display 110 and moves the circle C from a lower part to an upper part of the display 110 while causing the circle C to move backward and forward in a horizontal direction. After the circle C reaches a location illustrated in (d) of FIG. 10, the smartphone 100 further increases the size of the circle C over time and causes the circle C to have a lower brightness. Then, the smartphone 100 finally deletes the circle C displayed on the display 110.

According to the above examples, by causing light emission control in the illumination device 10A and display control in the display 110 to be carried out in conjunction with each other, the smartphone 100 allows expression such that a soap bubble produced from a flickering flame moves upward while expanding and swinging, and finally disappears. This allows a display of a moving image to further attract an interest of a user.

The smartphone 100 thus allows a display of a moving image in conjunction with expression of light by the illumination device 10A. In other words, the smartphone 100 is configured to carry out, in conjunction with light emission control in the illumination device 10A, a process for controlling a display of a moving image. For example, the illumination device 10A can include a display control section configured to carry out display control with respect to an image in conjunction with control carried out by a light emission control section 3 with respect to LEDs. According to Embodiment 3, the light emission control section 3 also has a function of the display control section. Note, however, that the display control section can be provided separately from the light emission control section 3. Note also that the illumination device 10A can include the display 110.

Note that the illumination device 10A of the smartphone 100 can be replaced with another illumination device (illumination device 10, 10B, etc.) in accordance with an aspect of the present invention. Note also that a location at which to provide the illumination device 10A can be appropriately determined by a producer of an electronic device.

The smartphone 100 is merely an example of an electronic device. An electronic device in accordance with an aspect of the present invention is not limited to a smartphone provided that the electronic device can include, for example, the illumination device 10A. (a) of FIG. 11 is a view illustrating an appearance of a mobile terminal 100A (electronic device) serving as another example of an electronic device in accordance with an aspect of the present invention, such as a tablet terminal. (b) of FIG. 11 is a view illustrating an appearance of a washing machine 200 (electronic device) serving as still another example of the electronic device in accordance with an aspect of the present invention.

As illustrated in (a) of FIG. 11, the mobile terminal 100A differs from the smartphone 100 in a location at which the illumination device 10A is provided. Furthermore, as illustrated in (b) of FIG. 11, the washing machine 200 includes the illumination device 10A. The washing machine 200 can be configured to carry out a predetermined process in conjunction with light emission control in the illumination device 10A. For example, the predetermined process can be an operation to send a notice to a user (e.g., an operation to sound an alarm about completion of washing). This more reliably allows the user to be aware of the predetermined process. An electronic device in accordance with an aspect of the present invention can alternatively be a general home appliance such as an air conditioner, a microwave, or a cleaner provided that the electronic device can include, for example, the illumination device 10A.

[Software Implementation Example]

Control blocks of each of the illumination devices 10, 10A, and 10B (particularly, the light emission control section 3) can be realized by a logic circuit (hardware) provided in an integrated circuit (IC chip) or the like or can be alternatively realized by software as executed by a central processing unit (CPU). In the latter case, each of the illumination device 10, 10A, and 10B includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

[Recap]

An illumination device (10) in accordance with a first aspect of the present invention includes: a projection section (7) on which beams of light which beams are emitted from respective two or more light sources (a first LED 1A, a second LED 1B) are to be projected; and a light emission control section (3) configured to control the two or more light sources so as to temporally change intensities of the beams of light, the two or more light sources being provided so that the beams of light which beams are emitted from the respective two or more light sources overlap in part in the projection section, and assuming that a part of the projection section in which part the beams of light overlap is an overlapping part, the light emission control section changing the intensities of the beams of light so that at least any one of a size, a location, and a shape of the overlapping part is temporally changed. According to the configuration, as described earlier, without the need to mechanically change respective locations of the two or more light sources, it is possible to produce movement or the like in light (a cluster of beams of light) that is projected on the projection section. This thus allows light to be more expressive by a simple configuration.

An illumination device in accordance with a second aspect of the present invention is preferably configured such that: in the first aspect, the two or more light sources include three or more light sources; and the three or more light sources are provided so that beams of light which beams are emitted from the respective three or more light sources overlap in part in the projection section. The configuration allows light to be still more expressive.

An illumination device in accordance with a third aspect of the present invention is preferably configured such that, in the first or second aspect, the light emission control section sets a period in which the two or more light sources simultaneously illuminate, and the light emission control section changes, in the period, the intensities of the beams of light which beams are emitted from the respective two or more light sources. According to the configuration, as described earlier, the overlapping part can be formed in the projection section. This makes it possible to change a shape of an image that is formed in the projection section from light that is projected on the projection section.

An illumination device in accordance with a fourth aspect of the present invention is preferably configured, in any one of the first through third aspects, to further include: a display section (display 110) configured to display an image; and a display control section (light emission control section 3) configured to carry out display control with respect to the image in conjunction with control carried out by the light emission control section with respect to the two or more light sources. The configuration makes it possible to further attract an interest of a user by displaying an image in conjunction with control with respect to a light source.

An illumination device in accordance with a fifth aspect of the present invention can be configured such that: in any one of the first through fourth aspects, at least one of the two or more light sources is a multicolor LED; and the light emission control section changes at least either colors or the intensities of the beams of light at a predetermined timing. The configuration makes it possible to express light such that the light flickers, i.e., such that a color of the light is changed while the light is moving. Use of a multicolor LED as a light source makes it easy to (i) change colors of light and (ii) adjust an intensity of the light.

An illumination device in accordance with a sixth aspect of the present invention can be configured such that, in any one of the first through fifth aspects, the light emission control section changes the intensities of the beams of light by use of a random number algorithm. The configuration makes it possible to express light like a flickering flame by use of a random number algorithm such as a 1/f fluctuation.

An illumination device in accordance with a seventh aspect of the present invention can be configured, in any one of the first through sixth aspects, to further include: a diffusion section (6) configured to diffuse the beams of light, the diffusion section being provided between (a) the two or more light sources and (b) the projection section. The configuration makes it possible to more reliably form the overlapping part in the projection section.

An illumination device in accordance with an eighth aspect of the present invention can be configured, in any one of the first through sixth aspects, to further include a spacer (8) which causes the two or more light sources and the projection section to be spaced. According to the configuration, the spacer allows a space between (a) the two or more light sources and (b) the projection section to have a width. This allows the space to function as a diffusion section.

An illumination device in accordance with a ninth aspect of the present invention can be configured such that, in any one of the first through eighth aspects, the two or more light sources are arranged on an imaginary circumference. The configuration makes it possible to express light such that the light two-dimensionally rotates.

An illumination device in accordance with a tenth aspect of the present invention can be configured such that, in any one of the first through eighth aspects, the two or more light sources are arranged on respective vertices of an imaginary polygon. The configuration makes it possible to express light such that the light two-dimensionally rotates.

An illumination device in accordance with an eleventh aspect of the present invention can be configured such that, in any one of the first through eighth aspects, the two or more light sources are three-dimensionally arranged. The configuration makes it possible to three-dimensionally express light.

An illumination device in accordance with a twelfth aspect of the present invention is preferably configured such that, in the eleventh aspect, the two or more light sources are provided on at least two of surfaces that are present at or near a corner of a supporting member (9) which has a three-dimensional shape. The light sources which are thus provided can be easily fixed in a case where light is three-dimensionally expressed. In addition, the light sources which are thus provided make it easy to position the light sources and other member(s) (in particular, the projection section).

An electronic device (100) in accordance with a thirteenth aspect of the present invention preferably includes an illumination device recited in any one of the first through twelfth aspects. The configuration allows light to be more expressive in an electronic device.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1A First LED (light source), 1B Second LED (light source), 1C Third LED (light source),
3 Light emission control section (display control section),
6 Diffusion section, 7 Projection section, 8 Spacer,
9 Supporting member, 10,10A,10B Illumination device,
100 Smartphone (electronic device), 100A Mobile terminal (electronic device)
110 Display (display section), 200 Washing machine (electronic device)

The invention claimed is:
1. An illumination device comprising:
a projection section on which beams of light which beams are emitted from respective two or more light sources are to be projected; and
a light emission control section configured to control the two or more light sources so as to temporally change intensities of the beams of light,
the two or more light sources being provided so that the beams of light which beams are emitted from the respective two or more light sources overlap in part in the projection section, and
assuming that a part of the projection section in which part the beams of light overlap is an overlapping part,
the light emission control section changing the intensities of the beams of light so that at least any one of a size, a location, and a shape of the overlapping part is temporally changed.
2. The illumination device as set forth in claim 1, wherein:
the two or more light sources include three or more light sources; and
the three or more light sources are provided so that beams of light which beams are emitted from the respective three or more light sources overlap in part in the projection section.

3. The illumination device as set forth in claim 1, wherein the light emission control section sets a period in which the two or more light sources simultaneously illuminate, and the light emission control section changes, in the period, the intensities of the beams of light which beams are emitted from the respective two or more light sources.

4. The illumination device as set forth in claim 1, further comprising:
   a display section configured to display an image; and
   a display control section configured to carry out display control with respect to the image in conjunction with control carried out by the light emission control section with respect to the two or more light sources.

5. The illumination device as set forth in claim 1, wherein:
   at least one of the two or more light sources is a multicolor LED; and
   the light emission control section changes at least either colors or the intensities of the beams of light at a predetermined timing.

6. The illumination device as set forth in claim 1, wherein the light emission control section changes the intensities of the beams of light by use of a random number algorithm.

7. The illumination device as set forth in claim 1, further comprising:
   a diffusion section configured to diffuse the beams of light,
   the diffusion section being provided between (a) the two or more light sources and (b) the projection section.

8. The illumination device as set forth in claim 1, further comprising a spacer which causes the two or more light sources and the projection section to be spaced.

9. The illumination device as set forth in claim 1, wherein the two or more light sources are arranged on an imaginary circumference.

10. The illumination device as set forth in claim 1, wherein the two or more light sources are arranged on respective vertices of an imaginary polygon.

11. The illumination device as set forth in claim 1, wherein the two or more light sources are three-dimensionally arranged.

12. The illumination device as set forth in claim 11, wherein the two or more light sources are provided on at least two of surfaces that are present at or near a corner of a supporting member of the illumination device which supporting member has a three-dimensional shape.

13. An electronic device comprising an illumination device recited in claim 1.

* * * * *